June 30, 1942.  M. KATCHER  2,288,164

SHAFT SEAL

Filed Oct. 7, 1940

INVENTOR
*Morris Katcher*
BY
*Emanuel Scheyer*
ATTORNEY

Patented June 30, 1942

2,288,164

UNITED STATES PATENT OFFICE 2,288,164

SHAFT SEAL

Morris Katcher, New York, N. Y.

Application October 7, 1940, Serial No. 360,025

8 Claims. (Cl. 286—7)

This invention relates to an improvement in seals, particularly seals for fluid pumps, such as the water pump of an internal combustion engine. As applied to a rotary shaft, it is adapted to eliminate or minimize leakage from the fluid chamber between the drive shaft and its bearing.

A feature of the invention resides in providing a ring or gasket of rubber or the like, which is caused to bind on the shaft yet has a portion extending directly radially out from it which can be freely moved axially into sealing relation with a sealing washer, pressing against the bearing or its mounting. As applied to a water pump, the binding of the rubber gasket on the shaft will not interfere with the pushing of the sealing washer against the end of the hub of the pump housing.

Another feature of the invention resides in the provision of an annular groove in the portion of the rubber gasket which grips the shaft dividing said portion into two parts with a space between them. Because of this space each of said parts can be wedged to the shaft independently of the other and hold water grease between them.

Another feature of the invention is to be found in the binding of the rubber gasket to the shaft at two separate places and the pressure of the gasket against the sealing washer at two separate places.

Another feature of the invention resides in the tapered groove formed in the face of the sealing washer into which the rubber gasket is forced serving to wedge the latter against the shaft at the same time it presses axially against the sealing washer.

Figure 1:
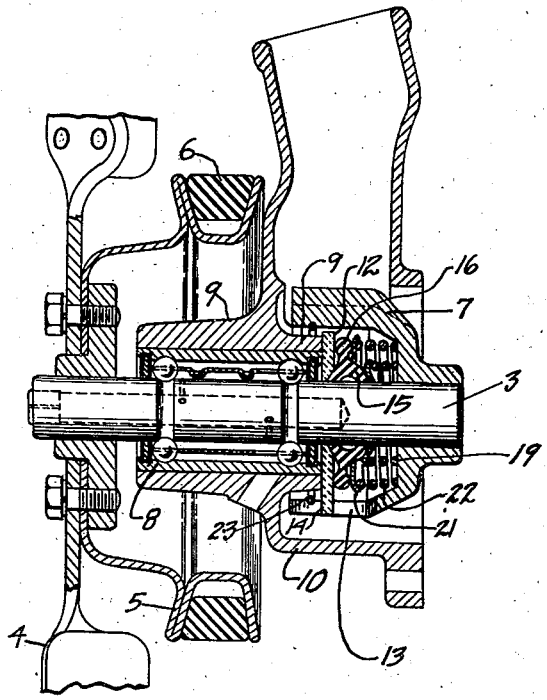
Figure 2:
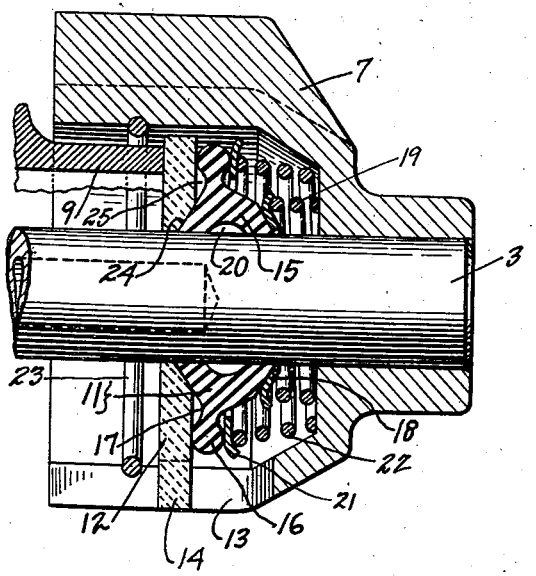

Other objects and advantages will become apparent upon further study of the description and drawing, in which:

Fig. 1 is a central vertical section through a portion of an automobile water pump showing the application of the shaft seal thereto, the pulley and a portion of the fan being also shown, and Fig. 2 is an enlarged central section through the seal and the impeller of the pump, a fragment only of the journal or hub of the pump housing being shown.

Shaft 3 at one end, has fan 4 fixed to it. Pulley 5 which is fixed to fan 4 is driven by belt 6. Fixed to the other end of shaft 3 is the impeller 7 of the pump. The shaft is mounted in a bearing 8 which in turn is set in hub 9 of pump housing 10. The particular type of bearing shown forms the subject of my application Serial No. 354,030.

A ring 11 of rubber or the like is mounted on shaft 3. Between ring 11 and the inner end of hub 9, a washer 12 is mounted on the shaft. Washer 12 is splined to impeller 7, one or more slots, as at 13 being provided in the impeller for receiving corresponding tongues of the washer as at 14. Washer 12 is of carbon, or of a phenol condensation product or of other materials which are well known to the art for washers used as in the present instance. Ring 11 has a rim which is substantially T-shaped in cross section. The main portion or head 15 of ring 11 is U-shaped in cross-section with the legs of the U extending radially inward. Portion 15 extends in a general axial direction. Extending radially directly outward from main or head portion 15 is a flange or stem which in cross section has a bulb-like outer portion 16 connected by a necked-down portion 17 to the main portion 15. Ring 11 normally has a snug fit on shaft 3, although not tight enough to bind thereon. Annular bearing plate 18 engages the inner end of portion 15 of ring 11. Between plate 18 and impeller 7 is a compression spring 19 urging the plate against portion 15 which in turn forces the latter downwardly against shaft 3 and forwardly against washer or sealing ring 12 for maintaining it in sealing relation with the washer and the washer in turn in sealing relation with the inner end of hub 9. It will be noted that plate 18 engages portion 15 at an angle so as to force it in both directions to maintain a seal between both shaft 3 and sealing washer 12. However, the binding of the inner end of portion 15 on shaft 3 interferes to a certain extent with its efficiency in bearing at its forward end against sealing washer 12, leaving the bearing at its forward end to take place largely, except as will be explained, through the yielding of the rubber of which portion 15 is formed. Sealing washer 12 is provided with a beveled recess 24 adjacent shaft 3, the outer end of portion 15 having a complementary bevel to fit therein, so that whatever axial pressure is transmitted to said outer end will also cause a binding of said end on the shaft, in addition to a pressure seal with washer 12. Portion 15 is hollowed out or internally annularly grooved between its inner and outer ends to leave a space 20 which is filled with water grease. The pressure on shaft 3 of the inner and outer ends or legs of portion 15 together with the water grease in space 20 acts to keep water from the pump from traveling along the shaft and reaching bearing 8. The water grease will permit portion 15 to slip along the shaft to allow the axial pressure from plate 18 to be transmitted directly to washer 14. Because of the annular groove or space 20, each part or leg of inward portion 15 can be wedged against the shaft to a certain extent independently of the other. The flexing of said legs due to the axial pressure of spring 19 causes them to grip shaft 3. Any binding on the shaft of the inner end or leg of portion 15 interferes with the pressure of ring 11 against sealing washer 12. The same holds true for the outer end or leg of portion 15. As it is desired to get a tight seal between ring 11 and sealing washer 12 and between washer 12 and the inner end of hub 9, without interference from the binding noted above, the flange having bulb portion 16 and necked down portion 17 is provided, said flange bearing axially only against washer 12. An annular bearing plate 21 engages the inner face of bulb portion 16. A compression spring 22, which extends between plate 21 and impeller 7, forces portion 16 axially against sealing washer 12 and the latter in turn against the inner end of hub 9. This prevents water from passing from the pump between the inner end of hub 9 and sealing washer 12 and between bulb portion 16 and washer 12.

Space 25 between bulb portion 16 and inner portion 15 can also be filled with water grease to assist in the sealing action between ring 11 and sealing washer 12.

A split ring 23 is provided for insertion into a groove in impeller 7, to prevent springs 18 and 22 from pushing out the parts before the impeller is assembled in the housing. Once assembled, the inner end of hub 9 holds back sealing washer 12, ring 23 then no longer functioning.

Sealing washer 12 has been described as bearing against the inner end of housing 9 for producing a seal to prevent the water from entering bearing 8, but the same effect can be produced by having the washer bear against the outer race ring of bearing 8. Actually said race ring can be considered as part of the housing itself. The drawing, Fig. 1, shows the washer bearing against both the housing and said race ring. In Fig. 1 of Patent No. 2,027,505, the washer is shown contacting a specially projecting collar on the bearing. The thought expressed in the claims of bearing against the housing is intended to be broad enough to cover bearing against the bearing instead, or bearing against both the housing and the outer race of the bearing.

The term "rubber" as used in the claims is intended to be broad enough to cover other similar materials such as synthetic rubber.

I claim:

1. A rubber sealing member for use in a fluid seal between a shaft and a housing, with a bearing for the shaft supported by the housing, said fluid seal having a sealing washer mounted about the shaft to bear against the housing, a member being fastened to the shaft in spaced relation to the washer with compression spring means provided in the space between the washer and said latter member, said rubber sealing member being ring-shaped and mounted about the shaft between the washer and the member fastened to the shaft to keep fluid from entering the bearing, the rubber member being substantially T-shaped in cross section, the head of the T being radially inward of its stem, the stem being pressed axially against the washer and the head against the shaft by said spring means, the washer in turn being pressed against the housing by the stem.

2. A rubber sealing member as claimed in claim 1 in which the portion of the head between the stem and the washer is substantially less in length than the portion of the head on the other side of the stem.

3. A rubber sealing member as claimed in claim 1 in which the head is substantially U-shaped in cross section with the crown of the U extending radially outward from the shaft and the stem extending from the head substantially where the latter is at its maximum distance from the shaft.

4. A rubber sealing member and compression spring means for use in a fluid seal between a shaft and a housing, with a bearing for the shaft supported by the housing, said fluid seal having sealing washer mounted about the shaft to bear against the housing, a member being fastened to the shaft in spaced relation to the washer, said rubber sealing member being ring-shaped and mounted about the shaft between the washer and the member fastened to the shaft to keep fluid from entering the bearing, the rubber member being substantially T-shaped in cross section, the head of the T being radially inward of its stem, said compression spring means pressing the stem and the head axially against the washer and in addition pressing the head against the shaft both at its end at the washer and at its end away from the washer.

5. A rubber sealing member for use in a fluid seal between a shaft and a housing, with a bearing for the shaft in the housing, said fluid seal having a sealing washer mounted about the shaft to bear against the housing, a member being fastened to the shaft in spaced relation to the washer with spring means provided in the space between the washer and said latter member, said rubber sealing member being ring-shaped and mounted about the shaft between the washer and the member fastened to the shaft to keep fluid from entering the bearing, the rubber member being substantially T-shaped in cross section, the head of the T being radially inward of its stem, the stem being pressed axially against the washer and the head against the shaft and the washer by said spring means, the washer in turn being pressed against the housing by the stem and the head.

6. A rubber sealing member for use in a fluid seal between a shaft and a housing, with a bearing for the shaft in the housing, said fluid seal having a sealing washer mounted about the shaft to bear against the housing, a member being fastened to the shaft in spaced relation to the washer with spring means provided in the space between the washer and said latter member, said rubber sealing member being ring-shaped and mounted about the shaft between the washer and the member fastened to the shaft to keep fluid from entering the bearing, the rubber member being T-shaped in cross section, the head of the T being radially inward of its stem, said spring means pressing the stem axially against the washer and the head against the shaft and the washer at the end of the head adjacent the washer, the washer in turn being pressed against the housing by the stem and the head.

7. A rubber sealing member for use in a fluid seal between a shaft and a housing, with a bearing for the shaft in the housing, said fluid seal having a sealing washer mounted about the shaft to bear against the housing, a member being fastened to the shaft in spaced relation to the washer with spring means provided in the space between the washer and said latter member, said rubber sealing member being ring-shaped and mounted about the shaft between the washer and the member fastened to the shaft to keep fluid from entering the bearing, the rubber member being T-shaped in cross section, the head of the T being radially inward of its stem, said spring means pressing the stem axially against the washer and the head against the shaft and axially toward the washer at the end of the head away from the washer, the washer in turn being pressed against the housing.

8. A rubber sealing member for use in a fluid seal between a shaft and a housing, with a bearing for the shaft in the housing, said fluid seal having a sealing washer mounted about the shaft to bear against the housing, a member being fastened to the shaft in spaced relation to the washer with spring means provided in the space between the washer and said latter member, said rubber sealing member being ring-shaped and mounted about the shaft between the washer and the member fastened to the shaft to keep fluid from entering the bearing, the rubber member being substantially T-shaped in cross-section, the head of the T being radially inward of its stem, the stem contacting the washer at its radially outer end being pressed axially against the washer and the head against the shaft and the washer by said spring means, the washer in turn being pressed against the housing by the stem and the head, the stem at its face toward the washer being concave, leaving a space thereby between its face and the washer.

MORRIS KATCHER.